United States Patent [19]

Wentworth

[11] Patent Number: 4,703,939
[45] Date of Patent: Nov. 3, 1987

[54] MECHANICAL SEAL WITH RADIALLY DISPOSED BIAS COMPONENT

[75] Inventor: Robert S. Wentworth, Temecula, Calif.

[73] Assignee: Borg-Warner Industrial Products, Inc., Chicago, Ill.

[21] Appl. No.: 753,830

[22] Filed: Jul. 11, 1985

[51] Int. Cl.⁴ .............................................. F16J 15/36
[52] U.S. Cl. ...................................... 277/88; 277/96.2
[58] Field of Search ..................................... 277/88–90, 277/93 R, 93 SD, 96.2

[56] References Cited

U.S. PATENT DOCUMENTS

| | | | |
|---|---|---|---|
| 2,279,669 | 4/1942 | Friskney . | |
| 2,863,680 | 12/1958 | Taltavall | 277/88 X |
| 2,871,039 | 1/1959 | Payne . | |
| 3,160,418 | 12/1964 | Barske | 277/90 |
| 3,269,738 | 8/1966 | Baumler et al. | 277/81 |
| 3,291,493 | 12/1966 | Blair | 277/92 |
| 3,480,285 | 11/1969 | Anderson | 277/88 |
| 3,601,413 | 8/1971 | Darnell | 277/96.2 |
| 3,866,925 | 2/1975 | Maimstrom et al. | 285/230 X |
| 4,306,727 | 12/1981 | Deane et al. | 277/12 |
| 4,509,773 | 4/1985 | Wentworth | 277/82 |
| 4,516,302 | 5/1985 | Chulada | 29/156.8 R |
| 4,583,748 | 4/1986 | Weichenrieder | 277/96.2 X |

FOREIGN PATENT DOCUMENTS

| | | | |
|---|---|---|---|
| 699001 | 12/1964 | Canada | 277/93 R |
| 714841 | 8/1965 | Canada | 277/90 |
| 2013337 | 4/1970 | France | 277/96.2 |
| 269665 | 4/1927 | United Kingdom | 277/90 |
| 752266 | 7/1956 | United Kingdom | 277/90 |
| 2029518 | 3/1980 | United Kingdom | 277/96.2 |

OTHER PUBLICATIONS

Aluminum Pechiney brochure relating to their Cefilac GPA Seal, 8 pp., 1978.

Primary Examiner—Robert S. Ward
Attorney, Agent, or Firm—Aubrey L. Burgess

[57] ABSTRACT

A mechanical seal assembly disposed within a pump housing for retarding the flow and leakage of fluids and other matter from being pumped along the motor drive shaft. The mechanical seal assembly of the present invention includes a non-rotating seal ring and a seal ring which rotates with the motor drive shaft. The non-rotating seal ring is resiliently mounted from the impeller side of the housing and is operably carried by the pump housing such that its seal face is urged toward the seal face of the rotating seal ring. A flexible assemblage comprises part of the non-rotating seal mounting arrangements and assures flexibility of the non-rotating seal face despite pump operating conditions.

18 Claims, 16 Drawing Figures

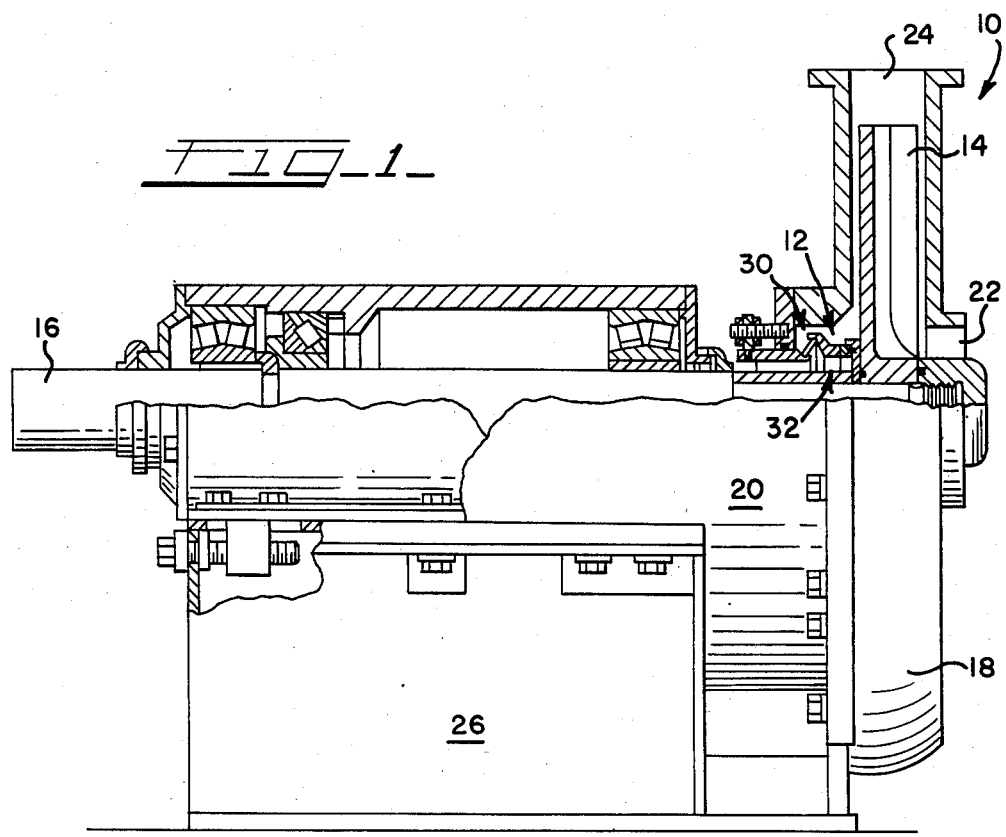
FIG_1_
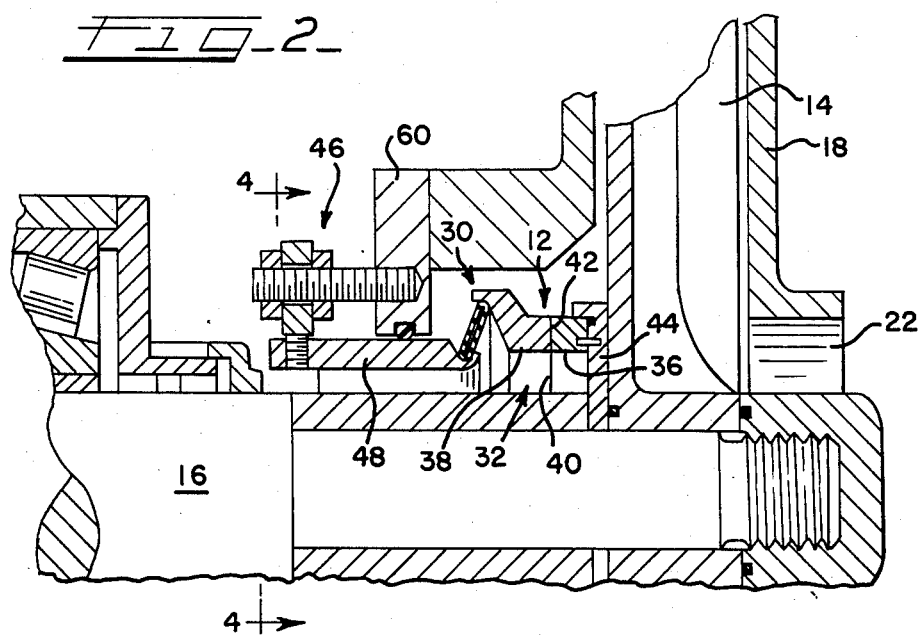
FIG_2_

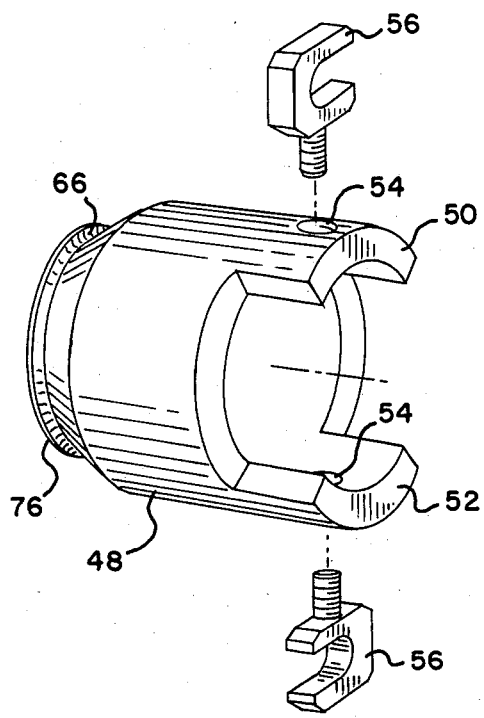
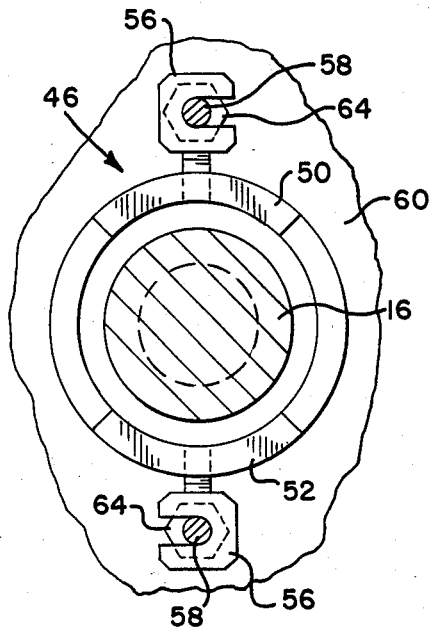
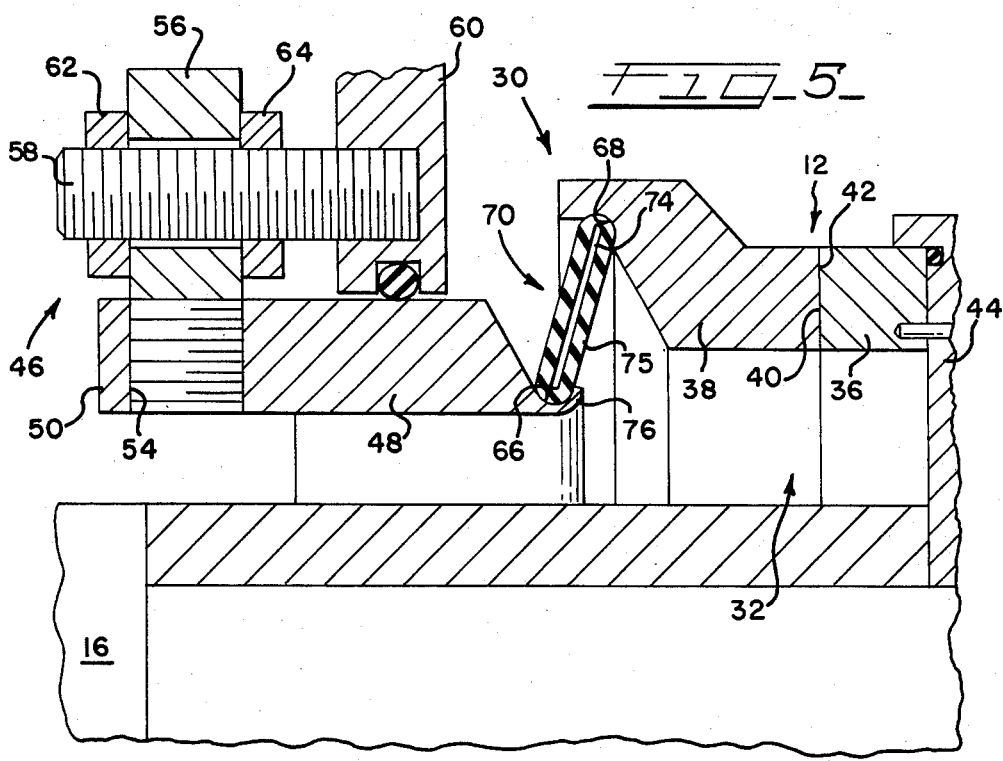

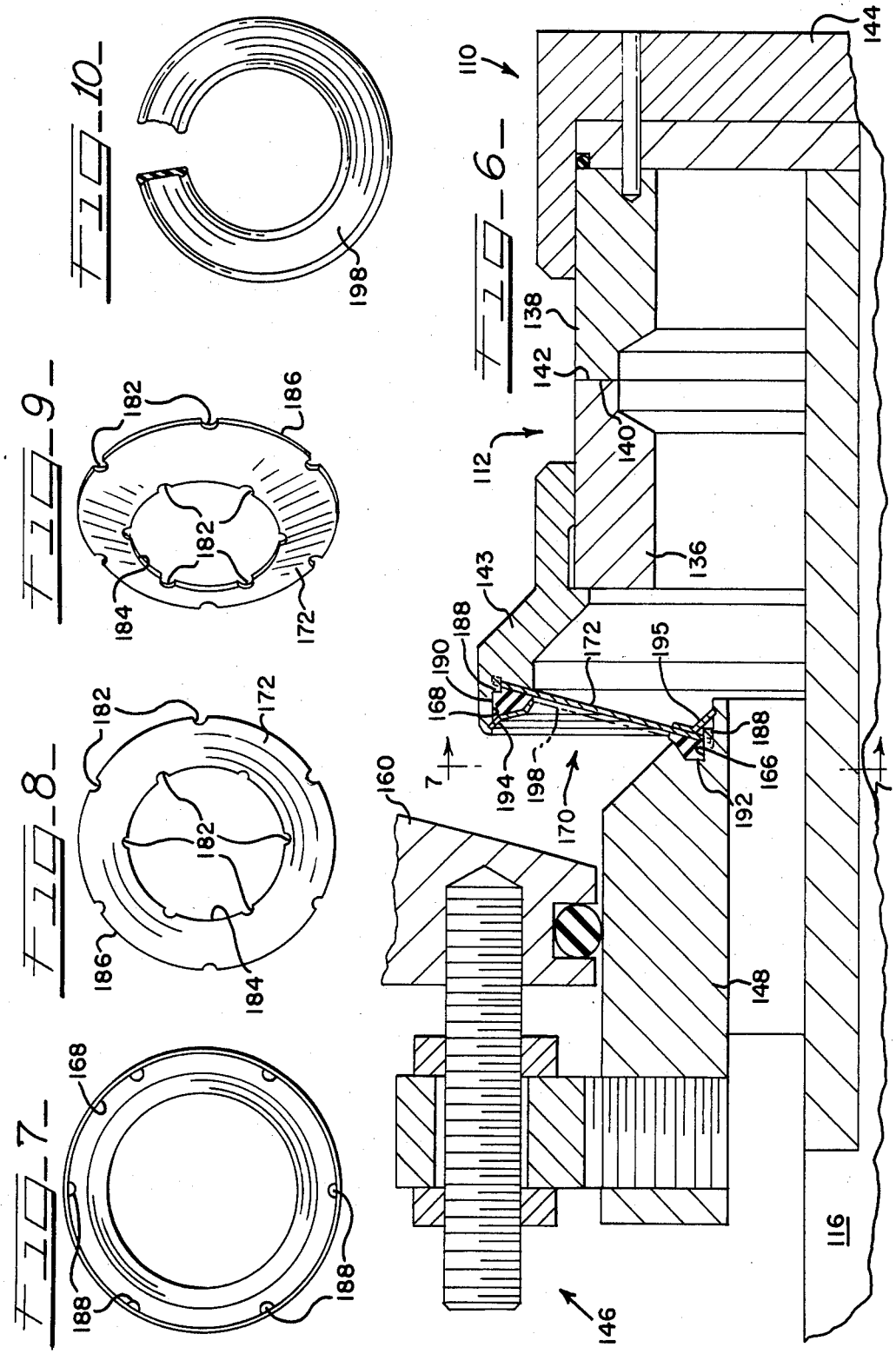

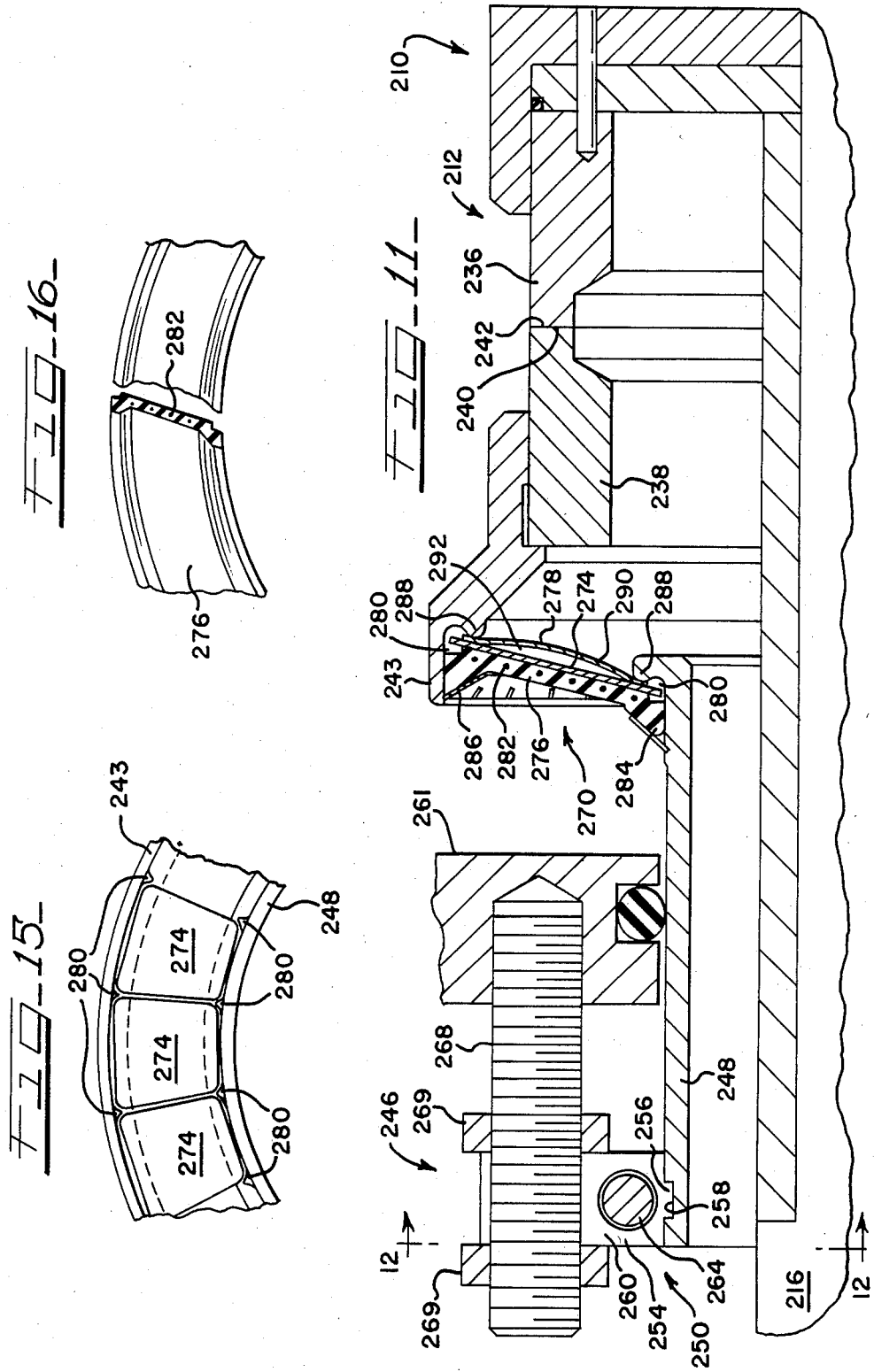

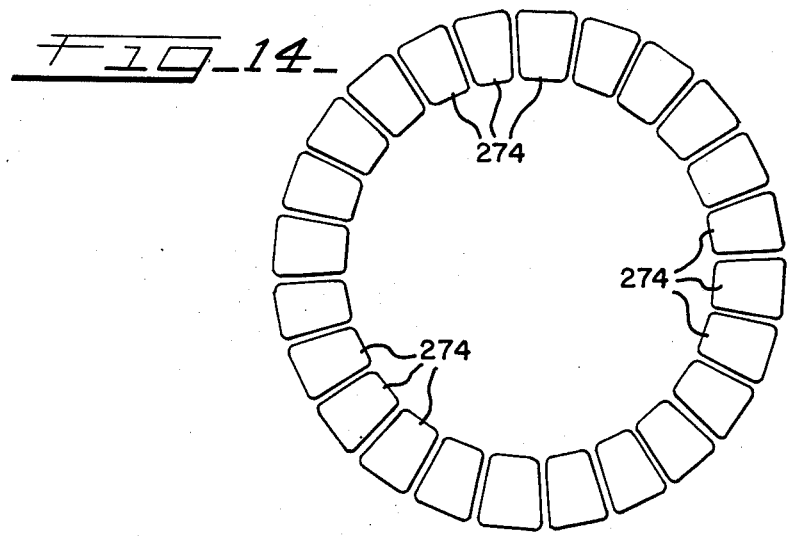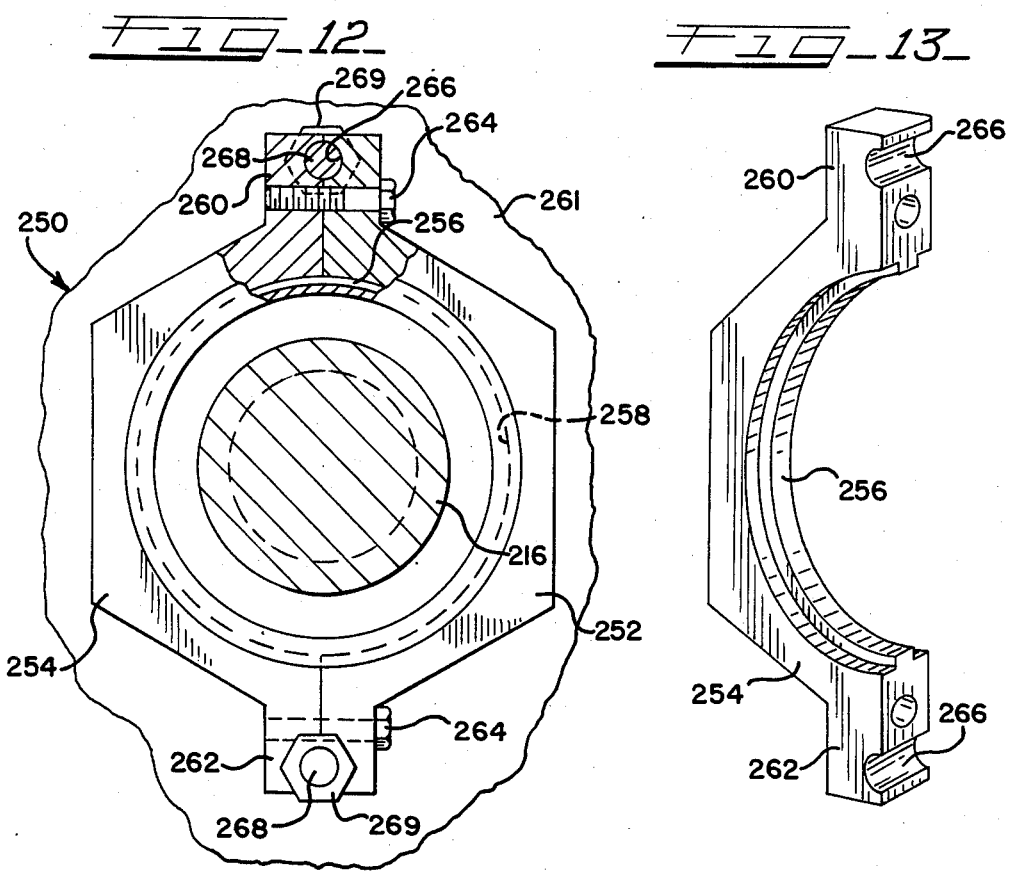

MECHANICAL SEAL WITH RADIALLY DISPOSED BIAS COMPONENT

FIELD OF THE INVENTION

The present invention relates to pumps, and more particularly to mechanical seals for pumps.

BACKGROUND OF THE INVENTION

A conventional mechanical seal used between a motor and a product pump includes a stationary seal ring usually connected to the motor housing and a rotatable seal ring operably connected to the motor shaft. Each seal ring is provided with a lapped seal face opposing the seal face of the other ring thereby establishing a dynamic fluid tight seal therebetween. Resilient means such as coil springs or bellows urge one seal ring face toward the other in a sealing relation.

Most mechanical seals of the type described have a number of metal parts, such as the coil springs or bellows which are exposed to the pump fluid. In pumps wherein precipitates are emersed or included in the pump fluid, the precipitate matter readily accumulates and hardens about the seals and associated mounting parts and presents unique problems. That is, because of manufacturing tolerance buildup and other factors, the seal ring faces must be permitted a degree of flexure relative to one another during pump operation. The brittle-hard precipitate buildup around and about the seals and their mounting assembly, however, quickly immobilizes the seal faces. Accordingly, deterioration of the seal surfaces usually occurs and the seal fails.

In Baumler et al, U.S. Pat. No. 3,269,738 a glide ring seal for use with a rotary piston motor is disclosed. This patent describes the use of a disk-type spring for pressing a glide ring into an operative position. Unlike the present invention, however, the Baumler et al reference is silent concerning a method and means for mounting the seal assembly in a balanced state from the impeller side of the housing and through axially adjustable means.

In Voytek, U.S. Pat. No. 3,272,519 seals for use between rear wheels of a tractor and a tractor frame are described. Each seal uses a pair of elastomeric "rounded square" cross section, sealing elements for urging a pair of seal rings toward one another. During use, the elastomers are stressed and deform to a diamond shape. Such action leaves crevices at the concave grooves into which the elastomeric members are received to collect debris.

The Pechiney Company of France has also developed a seal called the "Cefilac" seal. Unlike the present invention, the Pechiney device has a resiliently mounted rotating seal assembly. As a skilled artisan will appreciate, the resilient mounting of the rotary seal requires that the static seal must be arranged with unerring accuracy with respect to the drive shaft. In such construction, the sealant assembly is not retrofittable to the pump. Instead, various pump parts must be machined to accept the Cefilac seal. As mentioned, such parts must be machined with a great degree of precision. Such a tolerance relationship is difficult to establish and even harder to maintain when seal replacement is required.

SUMMARY OF THE INVENTION

Because of the above, the present invention provides a balanced mechanical seal which is retrofittable and is constructed for use with pumps adapted to move abrasive slurry or fluid having precipitate matter therein. The mechanical seal of the present invention comprises a rotatable seal ring and a non-rotatable seal ring, each having a seal face in juxtaposed relation. Unlike other seal arrangements, the non-rotating seal ring is resiliently mounted from the impeller side of the pump housing such that it is urged into a sealing relation with the other seal ring in a manner assuring flexure of the non-rotating seal face despite pump operating conditions, i.e., despite the buildup of precipitate matter about the seal rings and associated mounting structure. By such construction, limited flexure of the non-rotating seal face is assured and the demanding manufacturing constraints are greatly lessened.

The resilient mounting means for the non-rotatable seal ring includes seal carrier means operably associated with the pump housing. The mounting means provides for axial adjustment of the seal relative to the shaft whereby permitting proper seal face contact. As will be described in detail hereinafter, various forms or embodiments of resilient assemblies are radially disposed in a sealant manner between the seal carrier means and the non-rotatable seal ring. Such resilient assemblies include a spring biased member which is protected from the pump fluid and precipitate matter by a cover means. The spring biasing member provides the force necessary for urging and holding the end faces of the seal rings in pressure engagement. The protective cover means not only protects the biasing member from the often corrosive fluid product, but also, because of the internal flexibility between the cover and biasing member, imparts and assures a degree of flexibility therebetween whereby adding flexibilty to the non-rotating seal face despite the buildup of precipitate matter about the seal rings.

In line with the above, a primary object of this invention is the provision of a seal assembly which is capable of maintaining a reliable seal between two relatively rotating members for long periods of time and under adverse conditions, as for example, the incursion of precipitate matter about the sealant rings.

It is another object of this invention to provide a seal which has a high degree of resilient follow-up in the axial direction and which may tolerate considerable relative movement or runout between the members being sealed.

It is still another object of this invention to provide a sealant assembly which is substantially self-aligning and whose construction permits a proper setting of the axial load on the seal faces without regard to the alignment of the pump housing with respect to the shaft.

A further object of this invention is the provision of an improved face seal which eliminates the need for a coil spring biasing means.

Still a further object of this invention is to provide a sealant assembly whose construction permits assembly and removal of the seal from the impeller side of the housing.

Yet another object of this invention is to provide a readily replaceable face seal unit which is simple and practical in construction, efficient and reliable in performance, relatively inexpensive to manufacture and otherwise well adapted for the intended purposes.

BRIEF DESCRIPTION OF THE DRAWINGS

Having in mind the above objects and other attendant advantages that would be evident from an understanding of this disclosure, the invention comprises the devices, combination and arrangement of parts as illustrated in the presently preferred forms of the invention which are hereinafter set forth in detail to enable those skilled in the art to readily understand the function, operation, construction and advantages of same when read in conjunction with the accompanying drawings in which:

FIG. 1 is an elevational view, with portions broken away and shown in cross section, of a typical centrifugal pump incorporating a mechanical seal assembly constructed in accordance with the present invention;

FIG. 2 is an enlarged cross sectional view of a typical pump mechanical seal assembly incorporating the invention herein described;

FIG. 3 is a perspective view of one form of a seal carrier means adapted for use with the present invention;

FIG. 4 is an end view taken along line 4—4 of FIG. 2;

FIG. 5 is an enlarged cross sectional view of one form of seal assembly of the present invention;

FIG. 6 is an enlarged cross sectional view of another form of the seal assembly of the present invention;

FIG. 7 is an end view taken along line 7—7 of FIG. 6;

FIG. 8 is an end view of a diaphragm comprising a part of the second embodiment of the present invention;

FIG. 9 is a perspective view of the diaphragm illustrated in FIG. 8;

FIG. 10 is an end view of a protective fabric cover which may be used in cooperation with the sealant assembly illustrated in FIG. 6;

FIG. 11 is an enlarged cross sectional view of yet another form or embodiment of a seal assembly of the present invention;

FIG. 12 is an enlarged end view taken along line 12—12 of FIG. 11;

FIG. 13 is a perspective view of a portion of the bracket assembly illustrated in FIG. 12;

FIG. 14 is an end view of an annular array of plate segments forming a part of the sealant assembly illustrated in FIG. 11;

FIG. 15 is a partial enlarged view of the plate segment arrangement shown in FIG. 14 and illustrating their relationship with other portions of the seal assembly; and FIG. 16 is an enlarged view of a protective cover, a portion of which is shown in cross section, which comprises a portion of the sealant assembly of the present invention.

DETAILED DESCRIPTION OF THE PRESENT INVENTION

To simplify the invention disclosure, the drawings illustrate very little of the pump structure to which the invention is applied. FIG. 1 illustrates a typical pump assembly 10 incorporating one embidoment of a mechanical seal assembly 12. Only so much of the pump assembly 10 is shown as necessary for an understanding of the present invention. Suffice it to say, the pump assembly 10 includes an impeller 14 adapted to forcibly move pump product including precipitate matter under pressure and in the usual manner. To effect this end, the impeller is connected to a rottatable shaft 16 which, in turn, is connected to a prime mover such as an electric motor (not shown). The impeller 14 is located in a housing 18 which may be bolted or otherwise affixed to a frame member 20. The housing 18 is provided with a fluid inlet port 22 and a fluid outlet port 24. The frame member 20 provides support which allows the shaft 16 to rotate and frame member 20 may be bolted or otherwise secured to a fixedly positioned support member 26.

The mechanical seal assembly of this invention is constructed and arranged to substantially retard passage of fluid and precipitate matter being pumped from the impeller and pump housing along the motor shaft and ultimately to the motor or atmosphere. That is, the seal arrangement of the present invention provides an essentially fluid tight dynamic seal which retards the passage of pump product and precipitate matter between a first pressurized zone or area 30 wherein fluid and precipitate matter are being pumped along a predetermined path and a second zone or area 32 extending along the drive shaft 16 to the motor. It must be appreciated that though the sealant means of this invention may be considered to be essentially fluid tight, some leakage across the seal does, of necessity, occur. This is true of all face type mechanical seals and is essential to the prolonged service life of the seal structure.

The mechanical seal assembly 12 includes a pair of seal rings 36 and 38 surrounding a shaft 16. In this first embodiment, best depicted in FIGS. 2 and 5, the seal rings 36 and 38 are preferably constructed of a preformed sintered ceramic material, i.e., silicon carbide or other suitable wearing material depending on the particular environment in which the pump finds utility. Each seal ring has an opposing lapped seal end face 40 and 42. The abutment of end surface 40 with surface 42 provides the dynamic seal therebetween. The seal ring 36 rotates with the shaft 16 through its connection with a cylindrical sleeve 44, the latter being operatively associated with the shaft 16 and abutting the impeller 14. In comparison, the other seal ring 38 is relatively stationary and is resiliently mounted such that its seal face 42 is permitted to flex during pump operation. Unlike other seal arrangements, and for purposes of convenience, the mechanical seal of the present invention is mounted from the impeller side of the pump housing. By this construction, the drive assembly and alignment of the coupling between the drive motor and pump shaft is not disturbed. The seal ring 38 is operatively connected to a seal carrier means 46. In this embodiment, the seal carrier means includes a generally cylindrical bracket 48. As best illustrated in FIG. 3, at one end, the bracket 48 is provided with at least two projections 50 and 52 extending axially therefrom. Each of these projections is provided with a threaded aperture 54 which receives a fastener means 56 which extends outwardly from the bracket projections and is secured to the pump housing preventing rotation of the cylindrical bracket 48 and thereby the seal ring 38.

Turning to FIGS. 4 and 5, in the preferred embodiment, C bolts are used as the fastener means 56 for securing the bracket 48 and thereby the mechanical seal assembly against rotation relative to the housing. The free end of each fastener 56 is slideably arranged in association with a threaded member 58 projecting from a wall 60 of the housing 18. To axially position the seal carrier means 46 and thereby the seal ring 38 within the housing, operator accessible adjustable members 62 and 64, carried on the threaded members 58, and arranged on opposite sides of the C bolts serve to lock the seal carrier means 46 in any desired axially adjustable position. If desired, the axial disposition of the seal carrier means and thereby the seal ring 38 may be adjusted while the pump is operating through axial movement of members 62 and 64.

Turning now to FIG. 5, at its other end, the cylindrical bracket 48 is provided, in the first embodiment, with an annular concave groove 66. The sintered seal ring 38 is provided with a substantially similar annular groove 68. The two grooves 66 and 68 are so orientated to face one another. Radially interposed, in a sealant manner, between the two concave grooves is a circular elastomeric assembly 70. The assembly 70 comprises a disk like ring or diaphragm 74 generally in the form of a cone frustum which is preferably formed of a spring steel and which is encapsulated in an elastomeric material 75. The disk like ring 74 may include a single diaphragm member or a plurality of members having slotted overlying or corrugated fingers for effecting the same results. It should be noted that the grooves 66 and 68 on the bracket 48 and seal ring 38, respectively, are sized such that when the elastomeric assembly 70 is positioned therebetween, the elastomeric assembly is placed in compression sufficient to maintain a sealant and driving relationship therebetween.

By this construction, the elastomeric nature of the assembly along with its geometric configuration serves to act as a Belleville spring against the ring 38 whereby keeping the sealant face 42 in contact with seal face 40 of the rotatable seal ring 36. Moreover, it is important to note that the seal ring 38 is hydraulically balanced. That is, and as apparent from FIG. 5, the end seal face 42 of ring 38, albeit axially spaced from, is radially disposed near the midpoint of the diaphragm or ring 74, thus providing hydraulic balance thereto. Additionally, the concave groove 66 in the cylindrical bracket 48 may be cut, i.e., formed, with a projecting lip 76 so that the seal ring 70 tends to snap or detent into position thereby facilitating assembly of the seal. Furthermore, the elastomeric material 75 surrounding the spring 74 permits a degree of internal movement or radial mobility therebetween which translates to the seal face 42 despite the buildup of precipitate matter or other pump operating conditions about the seal rings 36 and 38.

A modified form of the invention is illustrated in FIGS. 6 through 10. It is to be understood, however, that the second embodiment of the invention has a similar purpose to that of the first embodiment and may be likewise arranged in a pump housing or assembly 110. But, for purposes of simplicity, only those components necessary for an understanding of the invention will be described. The mechanical seal assembly 112 includes a pair of seal rings 136 and 138 surrounding the driven pump shaft 116. The rotatable seal ring 138 and non-rotating seal ring 136, each have a seal face 140 and 142, respectively, which are arranged in opposed relation with their seal faces being resiliently urged toward one another in a manner hereinafter described. Seal rings 136 and 138, in the preferred embodiment, are the mirror image of one another, and are preferably constructed of a ceramic material such as silicon carbide. The seal ring 138 may be bonded or otherwise secured for rotation with the sleeve 144 carried by the pump shaft 116. The other seal ring 136 is bonded or otherwise secured to a cylindrically stepped ring member 143. Adjustable seal carrier means 146 including bracket means 148 are provided for mounting the seal ring 136 relatively stationary or against rotation with respect to the pump housing 110. The method and means for mounting the seal carrier means 146 and its cylindrical bracket means 148 to the pump housing are substantially the same as in the first embodiment and, thus, no further discussion will be devoted thereto.

At its other end, a resilient ring assembly 170 radially spans the distance, and is disposed in a sealant manner between the bracket means 148 and the ring member 143. The resilient ring assembly 170 comprises an apertured frusto conically shaped metal diaphragm 172 of one or more plies which is positionally accommodated within suitable grooves 166 and 168 provided on the bracket means 148 and annular ring member 143, respectively. As seen in FIGS. 8 and 9, the metal diaphragm 172 is provided with notches or teeth 182 on both the inner rim 184 and outer rim 186 thereof. Turning to FIGS. 6 and 7, such notches 182 or teeth are adapted for engagement with corresponding detents 188 on the bracket 148 and on the annular member 143 thus yielding greater torque transmission capability to this arrangement. A pair of elastomeric rings 190 and 192, disposed proximate the inner and outer rims of the diaphragm 172, protect or seal against the passage of pump fluid or other matter thereby. In the preferred embodiment, the elastomeric rings comprise a pair of Viton or silicone rubber "O" rings. A pair of retainer means 194 and 195 suitably accommodated in the bracket means 148 and the annular member 143 serve to releasably hold the diaphragm 172 and rings 190, 192 in assembled positional relation.

In an environment where a corrosive matter may contact the diaphragm, an alternative to the elastomeric rings may be used. As shown in FIG. 10, a rubber cover 198 may be used to protect the diaphragm against corrosive matter. In FIG. 6, the cover is shown in dotted lines. With either embodiment, it will be appreciated that the thrust of the spring diaphragm 172 acting on the annular member 143 will serve to urge the seal ring 136 toward the seal ring 138 thus enhancing the dynamic seal between the seal faces 140 and 142. Moreover, the resilience of the diaphragm 172 along with the inherent mobility between the diaphragm and the rings 190 and 192 will add to the flexure ability of the non-rotating seal ring face 142 despite operating conditions within the pump assembly.

Yet another embodiment of a mechanical seal assembly is schematically depicted in FIGS. 11 through 16. Although the purpose of all the embodiments is substantially the same, i.e., to provide a dynamic seal in a pump environment, this third embodiment has the capability of withstanding higher pressures within a pump housing 210 and, yet, provides the necessary flexure required for the non-rotating seal face despite pump operating conditions. The mechanical seal assembly 212 includes a pair of seal rings 236 and 238 surrounding the pump drive shaft 216. Both seal ring 236 and 238 have a seal face 240 and 242, respectively arranged in opposed relation with their seal faces being resiliently urged toward one another. Seal rings 236 and 238, in this embodiment, may be the mirror image of one another and are preferably constructed of a ceramic material such as silicon carbide or other suitable material depending on the pump environment. As in the other embodiments, the seal ring 236 is adapted for rotation with the pump drive shaft 216. The other seal ring 238 is preferably mounted in a non-rotatable fashion. The seal ring 238 may be bonded or otherwise secured to a cylindrically stepped ring member 243. Axially adjustable seal carrier means 246 is provided for mounting the non-rotary seal ring 238 from the impeller side of the pump housing. The mounting or carrier means 246 includes a tubular member or bracket means 248 which is telescopically arranged over the pump drive shaft 216. Secured to one end of the tubular member 248 is a mounting assembly 250. In this embodiment, the mounting assembly 250 is comprised of a complementary pair of apertured C blocks 252 and 254. As best depicted in FIGS. 11, 12 and 13, the C blocks include an annular projection 256 arranged for insertion into an annular groove 258 provided about the periphery of the tubular member 248. At the upper and lower extremes of each C block, there are provided flange portions 260 and 262. The upper and lower flange portion of each C block are releasably secured together by any suitable fastener means 264. The flange portions are provided or formed with complementary cutouts which, when assembled, define suitable openings or apertures 266. These openings or apertures 266 are suitably arranged and proportioned to accommodate threaded members 268 extending from a wall 261 of the pump impeller housing (not shown). To axially position the seal carrier means 246 and thereby the seal assembly 238 within the pump housing, adjustable members or nuts 269 carried on the threaded members 268 and arranged on opposite sides of the flange portions 260 and 262 serve to lock the seal carrier means 246 and thus the seal ring 238 in any desirable adjustable position. If desired, the axial disposition of the seal carrier means 246 and thereby the seal assembly 238 may be adjusted, while the pump operates, through axial movement of members 269.

At its other end, the tubular member 248 is provided with an elastomeric ring assembly 270 which is radially disposed in a sealant manner between the tubular member 248 and the ring member 243 of the seal ring 238. As schematically depicted in FIG. 11, the elastomeric ring assembly 270 of this third embodiment includes an annular array of plate segments 274, a protective fabric cover 276 arranged on one side or face of the plate segments 274, and a flexible diaphragm 278 arranged on the opposite side or face of the plate segments 274. As best illustrated in FIGS. 11 and 15, the plate segments 274 engage and are dispersed between detents or drive projections 280 provided both on the tubular member 248 and the annular member 243. Such a design increases the torque transmission capabilities of this sealant assembly. The plate segments 274 also allow this seal embodiment to withstand heavy pressure buildup within the pump housing. The protective fabric cover 276 disposed on one side of the plate segments 274 is impregnated with a conical or spiral spring 282. The spiral spring 282 in combination with segments 274 provides a low spring rate plus pressure capability. The protective cover 276 is held in place by inner and outer retainer rings 284 and 286 which are carried by the tubular member 248 and the annular member 243, respectively. On the side of the plate segments 274 opposite the protective cover, both the tubular member 248 and the annular member 243 are provided with a projecting lip 288. Interposed between the lip 288 and the plate segments 274 is flexible diaphragm 278 which has a portion or section which bellows outwardly from the plate segments 274 leaving a void or gap 292 therebetween. Into this void or gap there may be injected a gel like substance. The gel like substance may be of varying forms but should be one that does not change substantially in temperature and which is compatible with the rubber O rings and covers used in this construction. The flexible diaphragm 278 both resists the incursion of solids against the flexible plate like segment and maintains an adequate range of movement of the seal face 242 despite the accumulation and even hardening of precipitates thereabout. The insertion of a gel like substance into the void or gap 292 between the flexible diaphragm 278 and the plate like segments 274 also provides a degree of flexure for diaphragm movement despite the precipitate buildup and other pump operating conditions.

From the above description, it is apparent that in each of the foregoing embodiments an improved form of face type mechanical seal has been provided. In each embodiment, the stationary seal is mounted to the pump housing from the impeller side of the housing in such a manner that a degree of flexure for the non-rotating seal face is provided despite pump operating conditions. That is, despite the buildup of precipitate matter about the seal rings and the supporting means therefor, inherent in each of the designs illustrated and described is the ability of each to support and permit flexure of the non-rotating seal face while concurrently providing a thrusting force between the seal rings. This thrusting force enhances the sealing effect between the seal faces to accomplish the ends and objectives mentioned above.

Thus, there has been provided an improved mechanical seal for pumps which fully satisfies the objects, aims and advantages setforth above. While the invention has been described in conjunction with specific embodiments thereof, it is evident that may alternatives, modifications and variations will be apparent to those skilled in the art in light of the foregoing description. Accordingly, it is intended to embrace all such alternatives, modifications, and variations as fall within the spirit and broad scope of the appended claims.

Thus having adequately described my invnetion, what I claim is:

1. A mechanical seal assembly especially adapted for use with pumps having a pump housing and an impeller, with a motor drive shaft driving the impeller, said seal assembly comprising:

a rotatable seal ring fixedly positioned with respect to and connected to said shaft, so as to rotate therewith;

a non-rotating seal ring operatively associated with said housing;

each seal ring having an end face opposing the end face of the other seal ring and adapted to cooperate in sealing relationship therewith; and means for resiliently mounting said non-rotating seal ring from the impeller side of the housing, said mounting means comprising:

a seal carrier surrounding said shaft;

fastener means operatively securing said carrier to said housing, said fastener means permitting axial adjustment of said seal carrier and thus the non-rotating seal ring relative to said drive shaft;

said fastener means being so disposed relative to said pump housing to permit said axial adjustment during pump operation; and resilient, annular, disk-like spring means, radially disposed in a sealant manner between said seal carrier and said non-rotating seal ring for urging and holding the end faces of said seal ring in pressure engagement while maintaining a degree of flexure in the non-rotating seal ring during pump operating conditions.

2. The mechanical seal assembly as recited in claim 1, wherein said seal carrier and said non-rotating seal ring are annularly slotted to accommodate and position said disk-like spring means.

3. The mechanical seal assembly as in claim 1, wherein said seal carrier comprises a cylindrical bracket surrounding said shaft and having at least two axial projections, each projection having fastener means extending radially outwardly therefrom, the free end of each fastener means slidably engaging means on said housing for holding said seal carrier against rotation.

4. The mechanical seal assembly as recited in claim 3, wherein said holding means comprises threaded members extending axially from said housing and complimentary threaded means arranged thereon to axially fixedly position the fastener means and thereby the seal carrier with respect to the housing, and to permit said axial adjustment of said seal carrier and thus the non-rotating seal ring relative to said housing.

5. The mechanical seal assembly as recited in claim 1, wherein at least one of said seal rings is a preformed sintered annular ring whose end face engages the end face of the other seal ring.

6. The mechanical seal assembly as recited in claim 1, wherein said disk-like spring comprises an elastomeric encapsulated apertured diaphragm and wherein said seal ring end faces are balanced with respect to said apertured diaphragm.

7. The invention according to claim 4 wherein said fastener means are C bolts.

8. A mechanical seal arrangement for a pump having a housing, a rotary assembly in said housing including a shaft and a pump impeller connected to said shaft, said seal arrangement comprising:
a pair of seal rings surrounding said shaft with seal faces opposing one another for retarding passage of pumped fluid and precipitate matter from a pressurized zone to another zone, one of said seal rings being rotatable and fixedly positioned with respect to said shaft and said impeller, and the other seal ring being non-rotatable with respect to said shaft and said housing;
means for resiliently mounting said non-rotatable seal ring from the impeller side of the housing such that its seal face is permitted to flex during pump operation;
said mounting means comprising annular support means surrounding said shaft and adjustably carried by said housing;
means to adjust the axial position of said support means relative to said housing and during pump operation; and
means disposed between said non-rotatable seal ring and said support means having a frusto conical apertured diaphragm means capable of withstanding the pressures in said pressurized zone;
said diaphragm means being so constructed and arranged to apply a resilient force against said non-rotatable seal ring to urge the seal face thereof toward the seal face of the other seal ring;
said diaphragm means being so constructed and arranged to positively engage both said support means and said non-rotatable seal ring to prevent slippage therebetween.

9. The mechanical seal arrangement as recited in claim 8, wherein a pair of radially spaced elastomeric means are disposed about inner and outer rims of said diaphragm means so as to seal a joint established between the diaphragm means and the non-rotatable seal ring, said pair of elastomeric means being positioned on that side of the diaphragm means exposed to the pressurized fluid.

10. The invention according to claim 9 wherein said elastomeric means comprises O rings.

11. The mechanical seal arrangement of claim 9 wherein retainer means are disposed against and on the other side of said diaphragm means.

12. The mechanical seal arrangement of claim 8 wherein a protective cover is arranged on that side of the diaphragm means exposed to said pressurized zone.

13. The mechanical seal assembly of claim 8 wherein the seal face of the non-rotatable seal ring is disposed in a balanced relationship with respect to the diaphragm means.

14. A mechanical face seal assembly for sealing a relatively rotating shaft in a pump housing to provide an essentially fluid tight seal between a first and a second zone and to retard the passage of pump product between said zones, said mechanical face seal assembly comprising:
a non-rotating seal ring surrounding the shaft having an end seal face urged into sliding engagement with a coacting seal face on a relatively rotating seal ring to provide a dynamic seal between the housing and the shaft;
means supporting said non-rotating seal ring comprising;
an axially adjustable cylindrical bracket coaxially arranged about said shaft and connected to said pump housing;
means to adjust the axial position of said supporting means relative to said housing during pump operation; and
a resilient assembly arranged for sealing engagement between said cylindrical bracket and said non-rotating seal ring for also maintaining said non-rotating seal ring end seal face in pressure engagement with the coacting seal face of said rotating seal ring during pump operating conditions.

15. The mechanical seal assembly according to claim 14 wherein said resilient assembly includes an annular array of plate segments disposed between the cylindrical bracket and the non-rotating seal ring for radially supporting and maintaining the seal ring relatively non-rotating.

16. The mechanical seal assembly according to claim 15 wherein one side of said annular array of plate segments is protected from the pump product by an annular fabric cover impregnated with a conical spring for urging one seal end face against the other.

17. The mechanical seal assembly according to claim 16 wherein a flexible diaphragm is disposed between the bracket means and the non-rotating seal ring on the opposite side of said annular array of plate segments.

18. The invention according to claim 17 wherein a gel like substance is interjected between the diaphragm and said plate segments to provide a degree of flexibility to the non-rotating seal under pump operating conditions.

* * * * *